(12) United States Patent
Herbst et al.

(10) Patent No.: US 7,761,428 B2
(45) Date of Patent: Jul. 20, 2010

(54) SYSTEM, METHOD, AND SOFTWARE FOR MANAGING INFORMATION RETENTION USING UNIFORM RETENTION RULES

(75) Inventors: Axel Herbst, Eppingen (DE); Bernhard Brinkmoeller, Wiesloch (DE); Marcus Pfeifer, Heidelberg (DE)

(73) Assignee: SAP AG, Walldorf (DE)

( * ) Notice: Subject to any disclaimer, the term of this patent is extended or adjusted under 35 U.S.C. 154(b) by 368 days.

(21) Appl. No.: 11/788,608

(22) Filed: Apr. 20, 2007

(65) Prior Publication Data

US 2008/0263108 A1    Oct. 23, 2008

(51) Int. Cl.
G06F 17/00    (2006.01)

(52) U.S. Cl. .................. 707/661; 707/662; 707/665; 707/668

(58) Field of Classification Search ......... 707/200–204, 707/661–668; 711/161
See application file for complete search history.

(56) References Cited

U.S. PATENT DOCUMENTS

| | | | |
|---|---|---|---|
| 6,691,309 B1 * | 2/2004 | Lorie | 717/175 |
| 7,233,959 B2 | 6/2007 | Kanellos et al. | |
| 7,269,132 B1 * | 9/2007 | Casey et al. | 370/219 |
| 7,401,092 B2 * | 7/2008 | Dunsmore et al. | 707/102 |
| 2003/0121005 A1 | 6/2003 | Herbst et al. | |
| 2003/0131014 A1 | 7/2003 | Brinkmoeller et al. | |
| 2004/0167934 A1 | 8/2004 | Margolus et al. | |
| 2005/0071383 A1 | 3/2005 | Herbst et al. | |
| 2005/0193042 A1 | 9/2005 | Steinmaier et al. | |
| 2005/0198052 A1 | 9/2005 | Steinmaier et al. | |
| 2005/0198078 A1 | 9/2005 | Steinmaier et al. | |
| 2006/0004847 A1 | 1/2006 | Claudatos et al. | |
| 2006/0167929 A1 * | 7/2006 | Chakraborty et al. | 707/102 |
| 2006/0235906 A1 | 10/2006 | Brinkmoeller et al. | |
| 2006/0236061 A1 * | 10/2006 | Koclanes | 711/170 |
| 2007/0106710 A1 | 5/2007 | Haustein et al. | |
| 2007/0276843 A1 * | 11/2007 | Lillibridge et al. | 707/100 |
| 2008/0168135 A1 * | 7/2008 | Redlich et al. | 709/204 |
| 2008/0313217 A1 * | 12/2008 | Dunsmore et al. | 707/102 |

OTHER PUBLICATIONS

Office Action issued in U.S. Appl. No. 11/788,804 on Feb. 4, 2010; 22 pages.
Office Action issued in U.S. Appl. No. 11/788,804 on Jun. 26, 2009; 17 pages.

* cited by examiner

*Primary Examiner*—Don Wong
*Assistant Examiner*—Hanh B Thai
(74) *Attorney, Agent, or Firm*—Fish & Richardson P.C.

(57) ABSTRACT

Systems, methods, and software for archiving structured data and associated unstructured data associated are disclosed. Particularly, the structured and unstructured data are archived such that the structured data and the unstructured data remain associated to each other. Properties of the structured data are also applied to the unstructured data, enabling the unstructured data to be retained with the structured data throughout the retention period of the structured data. Moreover, destruction (or prevention of destruction) of the archive data object can be managed and propagated to the unstructured data instances.

25 Claims, 10 Drawing Sheets

View/Modify Properties
wdfd00127443a:1081/abc/bo/bce/sales_order/salesineurope/org_xyz/jan2006/run4711/

| Tag | Namespace | Value |
|---|---|---|
| legal_hold  720 | http://www.abc.com/ILM/ | |
| case | http://www.abc.com/ILM/ | Lawsuit Miller |
| case | http://www.abc.com/ILM/ | Tax proceedings |
| creationdate | DAV: | 2006-11-24T08:50:00Z |
| getlastmodified | DAV: | Fri, 24 Nov 2006 08:53:01 GMT |
| getetag | DAV: | "307ce-0-4fb8236a" |
| resourcetype | DAV: | |
| supportedlock | DAV: | |
| lockdiscovery | DAV: | |
| getcontenttype | DAV: | httpd/unix-directory |

750 — [Add] [Delete] [Save] [Close]

FIG. 10

View/Modify Properties
wdfd00127443a:1081/abc/bo/bce/sales_order/salesineurope/org_xyz/jan2006/run4711/

| Tag | Namespace | Value |
|---|---|---|
| legal_hold | http://www.abc.com/ILM/ | |
| case | http://www.abc.com/ILM/ | Lawsuit Miller |
| creationdate | DAV: | 2006-11-24T08:50:00Z |
| getlastmodified | DAV: | Fri, 24 Nov 2006 08:53:01 GMT |
| getetag | DAV: | "307ce-0-4fb8236a" |
| resourcetype | DAV: | |
| supportedlock | DAV: | |
| lockdiscovery | DAV: | |
| getcontenttype | DAV:  760 | httpd/unix-directory |

[Add] [Delete] [Save] [Close]

SYSTEM, METHOD, AND SOFTWARE FOR MANAGING INFORMATION RETENTION USING UNIFORM RETENTION RULES

TECHNICAL FIELD

This disclosure relates to systems and methods for information management and, more particularly, to retaining and associating structured data and related unstructured data during long-term storage and ultimate destruction of the structured and unstructured data.

BACKGROUND

Information, particularly business information, like the amount payable for a certain sales order has a life cycle that often begins with creation of a Business Object (the sales order) in an IT system. Here the sales order can be viewed as data carrying the information. During its lifecycle the information (amount payable for the order) is passed to other business objects like the invoice or copies of the extracts of the original data that are copied to Information warehouses. Each of these pieces of data has a lifecycle that ends with the disposition/destruction of the data. The end of the life cycle of the Information is reach when the last bit of data containing the information is destroyed. Prerequisite for the management of the lifecycle of information is the knowledge of the information flow between data and a uniform life cycle management of the data carrying the information. In other words, data could be considered a concrete materialization of information.

Such information and data (collectively referred to as "information"), particularly business information, have a life cycle that often begins with creation of the information and concludes with the disposition/destruction of the information. During a portion of information's life cycle, the information may be subject to use and modification depending upon changes occurring during the course of the information's use. However, during another portion of the information's life cycle, the information may go unchanged for a period of time. In fact, during such a time period (i.e., "retention period"), all modification to the data may be prohibited and the information may be available only for review, i.e., the information may (effectively) be available in read-only form. During the retention period, the information may be stored in a long-term storage system or archive. This may be particularly desirable when the information is no longer needed or useful in the course of use and can be transferred to a dedicated storage system such that it benefits—or doesn't substantively adversely effect-a business operation, perhaps by improving efficiency of applicable or related systems or applications.

At some point during the retention period, the information may be destroyed according to various reasons, such as legal requirements, business policies, and so forth. In other situations, the information may become relevant to or evidence in a legal matter or proceeding. Thus, notwithstanding otherwise applicable reasons, the information requires extended retention for use to resolve the legal proceeding. Further, other legal requirements or business policies may necessitate retention of the business information in a particular physical location while destroying similar business information in others.

SUMMARY

The present disclosure describes systems and methods operable to determine, for example, a residence period, retention period, and/or an expiration date based on attributes or properties of information; categorize and index the information (interchangeably referred to as a "business object" or "BO") based on the BO's attributes or properties; and transfer the information from a primary system to an archive. Further, according to some implementations, an individual BO or group of BOs are associated with an expiration date. The BOs are then destroyed upon occurrence of the expiration date. Although the present disclosure is described with reference to business information, the scope of the present disclosure is not so limited but is applicable to any type of information and/or data.

Moreover, some or all of these aspects may be further included in respective systems or software for executing, implementing, or otherwise managing information. The details of one or more implementations are set forth in the accompanying drawings and the description below. Other features, objects, and advantages will be apparent from the description and drawings, and from the claims.

DESCRIPTION OF DRAWINGS

FIG. 5 is a screen shot of a GUI for defining retention time rules according to one implementation;

FIGS. 7-11 illustrate example screen shots of a GUI for managing properties of archived data according to one implementation;

DETAILED DESCRIPTION

The present disclosure provides methods and systems for managing information. The systems and methods may include a business application that generates data as some embodiment or instance of information. This data (generally referred to as information) may remain active, i.e., the information may be utilized or capable of being utilized by an application, for a period of time, and, thereafter, the information may be archived. The methods and systems apply and enforce retention rules, such as a residence period, retention period, and expiration date, of the data. Further, the methods and systems are capable of defining residence and retention periods across one or more applications, thereby defining residence and retention periods for information carried by more than one application. That is, the methods and systems are not limited to information utilized by a single application but, rather, may be utilized to manage retention properties, such as the residency and retention periods as well as expiration dates, for information of any number of applications. The methods and systems also provide for archiving the data so that the information is readable even though the application that generated or used the information has been disabled or is otherwise no longer in use. Further, the methods and systems provide for modifying the retention properties both prior to and after the information has been archived.

Management of these data can include, inter alia, identifying one or more pieces of information, determining a residency and retention period for the data, archiving the data in related groups, assigning a destruction time (e.g., expiration date) to the data, and destroying the data upon passage or occurrence of the destruction time. There may be one or more user-defined or default retention time rules that are relevant for the same data. The retention time rules are used to apply retention properties to the data. The retention properties are associated with the identified data, and the data is archived and ultimately destroyed according to the associated retention properties. Further, the retention properties are also applied to other data, such as an attachment, related to or otherwise associated with the data and carrying similar information. Accordingly, the data and any related attachments, for example, are retained and ultimately destroyed together, and any modifications to the data's retention properties are inherited by the related attachments.

Figure 1:
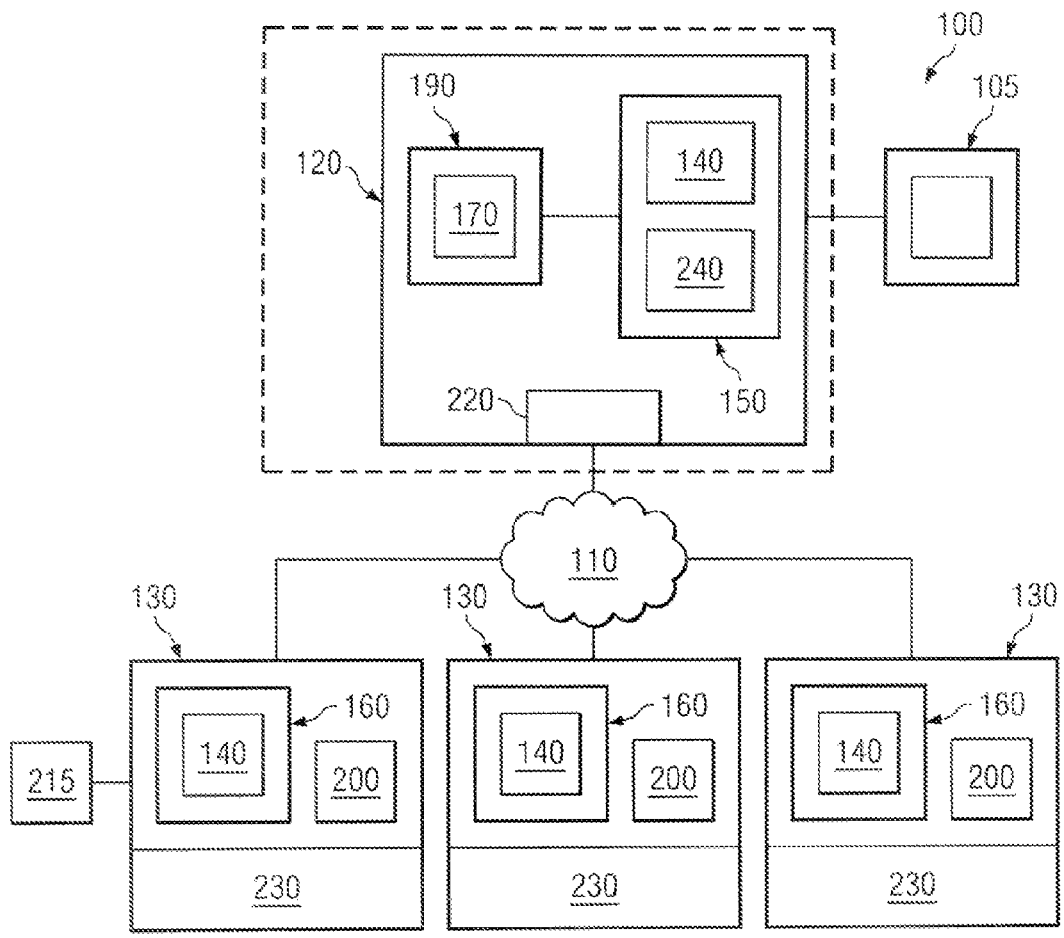
FIG. 1 illustrates an example information management system according to one implementation of the present disclosure.

More specifically, FIG. 1 shows a system 100 for managing information contained in application data, and archiving this data based on one or more criteria. Application data may include data associated with one or more business applications or modules. This application data may be organized into business objects or include global data types that span applications. Each BO, such as BO 170 shown in FIG. 3, may be considered an organizational unit of application data. As shown, an innermost layer or kernel 810 of the BO 170 may represent the BO's inherent data. Inherent data may include, for example, an employee's name, age, status, position, address, etc. A second layer 820 may be considered the BO's logic. Thus, the layer 820 includes the rules for consistently embedding the BO in a system environment as well as constraints defining values and domains applicable to the BO. For example, one such constraint may limit sale of an item only to a customer with whom a company has a business relationship. A third layer 830 includes validation options for accessing the BO. For example, the third layer 830 defines the BO's interface that may be interfaced by other BOs or applications. A fourth layer 840 is the access layer that defines technologies that may externally access the BO.

Figure 3:
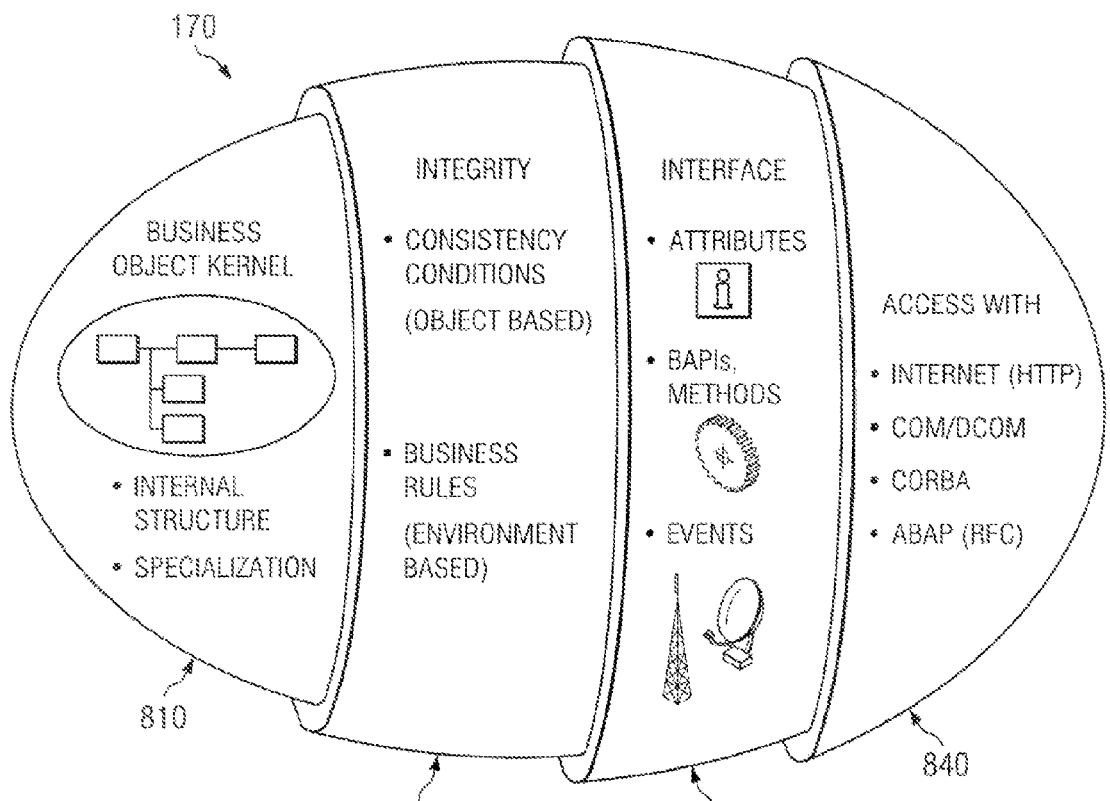
FIG. 3 is a graphical illustration of a business object, according to one implementation of the system in FIG. 1.

Accordingly, the third layer 830 separates the inherent data of the first layer 810 and the technologies used to access the inherent data. As a result of the described structure, the BO reveals only an interface that includes a set of clearly defined methods. Thus, applications may only access the BO via those defined methods. An application wanting access to the BO and the data associated therewith must include the information or data required to execute the clearly defined methods of the BO's interface. The clearly defined methods of the BO's interface represent the BO's behavior. That is, when the methods are executed, the methods may change the BO's data. Therefore, an application may utilize any BO by providing the required information or data without having any concern for the details related to the internal operation of the BO. The BO 170 illustrated in FIG. 3 is merely one example of the structure that may utilized by a business object. Accordingly, other BOs having different features or structure are within the scope of the present disclosure.

Figure 4:
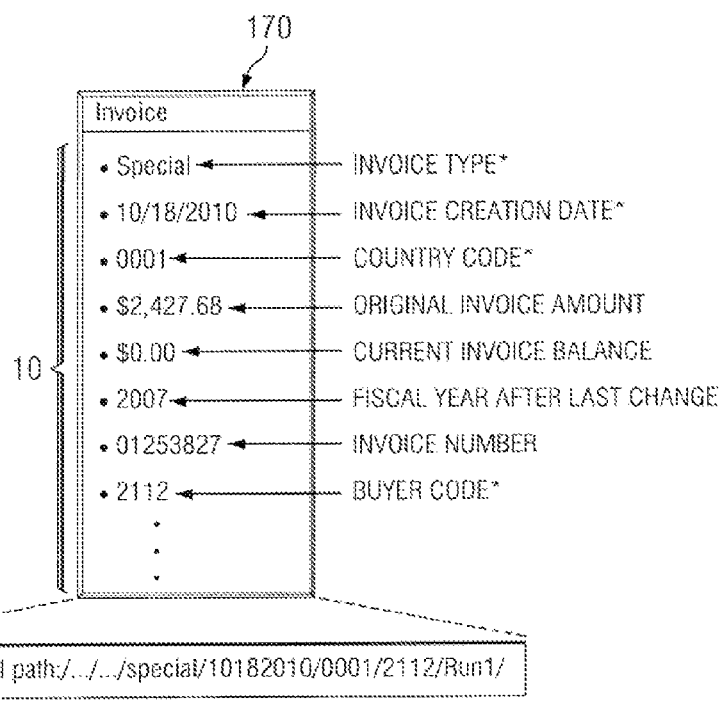
FIG. 4 is a graphical illustration of a business object and a hierarchical path used for archiving the business object.

Referring to FIG. 4, BOs, such as BO 170, may represent transactional information, such as an invoice, and the attributes or properties (interchangeably referred to as "metadata") 10 of the BO may include, for example, the invoice creation date, the purchaser's identification, identification of a product or services contemplated by the invoice, the date the product or services were provided, an amount contemplated by the invoice, the location identifier of the parties of the invoice, the date on which the invoice was closed, etc. In another instance, the BO may be employee data having properties such as an employee identification, employment start period, employee end period, job title, mailstop, etc. Further, the BO may be any type of information used for any purpose. Thus, for example, the BOs represent purchase orders or invoices and include invoice numbers or identifiers, invoice names, order status identifiers, product descriptions, product names or identifiers, vendor product numbers or identifiers, product categories, vendor names or identifiers, requesting party names or identifiers, product recipient names or identifiers, delivery locations, account numbers, account assignment categories, account assignment values, invoice recipient names or identifiers, invoicing parties, gross invoice values, gross invoice amounts, and invoice dates, to name a few possibilities. Each BO is generally considered structured data because the data contained in a BO may be organized in a structured manner. Moreover, each BO may also have associated therewith one or more other pieces of unstructured data ("attachments"). An attachment (interchangeably referred to as "unstructured data") is related to the BO but may not be directly included with the BO. An attachment may include, for example, a document, such as a performance evaluation or e-mail; a figure, such as a drawing or picture; or other information related to the BO. That is, the attachment may be separate from but coupled to, or otherwise associated with, the BO, such as with a link.

The system 100 may be utilized to perform a query or search for one or more BOs satisfying one or more criteria. One or more designations or retention properties are then assigned or otherwise applied to the BOs satisfying the search criteria. For example, a residence time, a retention time, and/or an expiration/destruction time may be applied to the BOs. A residence time designates an amount of time a BO may be retained with, or otherwise accessible to, an application that utilizes the BO or updates or revises the information contained or associated with the BO. That is, the residence time may refer to an amount of time the BO is to be retained prior to archiving. During that time, the BO may be freely available to use and manipulation by one or more applications. The retention time may refer to an amount of time the BO is to be retained prior to being destroyed. That is, the retention time can be considered the time period during which the BO is stored in an unchanged or immutable condition until the BO is destroyed. In such circumstances, the BOs may be archived in a WORM (Write Once, Read Many) state. However, the BOs need not be maintained in an immutable condition. Rather, according to other implementations, the BOs may be stored in the long-term storage system in a form that may be modified. A majority of the lifespan of a BO may be the retention period, during which time the BO may be stored in an archive. Generally, archiving involves long-term, immutable storage of information. Archiving data or information may be required for legal reasons, such as to comply with statutes regarding product liability or taxation.

Once the residence time transpires, the BO may be transferred to a storage system, such as a long-term storage system.

According to some implementations, where the BO is initially provided in a proprietary format, the BO may be converted into an open standard format or any other desired format, for example, prior to or during the course of archiving. For example, the BO may be converted to eXtensible Markup Language ("XML") format prior to being archived. The conversion permits subsequent review, i.e., examination of the contents, of the BO without the need for one or more of the original applications, which may no longer be available or compatible. Without such a conversion, gleaning any of the information contained in the BO is normally an expensive and time-consuming endeavor. After archival, the information may be deleted from the more active storage locations where information is regularly accessed, utilized, and/or manipulated. Consequently, archiving information may include removing unnecessary information, permitting more efficient operation of a system on which the applications run (often referred to as a "primary" or "active" system), such as server 120, discussed below. The primary system may be coupled to and operable with the long-term storage system, such as long-term storage system 105. Archival storage may save money by keeping the BOs on hardware that includes less functionality, less speed, and, therefore, a lower cost. Less functionality is acceptable because, after archiving, the BOs may be rarely, if at all, recalled. As also discussed below, each client 130 may also be coupled to a long-term storage system 215.

Also, prior to or during archiving of the one or more BOs, an index of the BOs being archived may be created. The index may include an identification of the BOs contained in the archive and include a precise storage location for each archived BO. The index may be retained to identify BOs that have been archived and removed from the primary system as well as to identify any BOs that may require retention beyond the BOs' associated retention time. Such may be the case when it is determined, for example, that one or more BOs may be required or otherwise associated with an ongoing, pending, or expected legal proceeding. In such circumstances, a hold may be placed on the one or more BOs, preventing destruction of the BOs if the corresponding retention time expires while the hold remains. Once the retention time of a BO has expired and a hold does not exist, the BO is destroyed or removed from the long-term storage system. Thus, the BO's lifespan ends, and the BO is eliminated.

According to some implementations, archiving one or more BOs also involves archiving the other data associated with the one or more BOs, such as the attachments. Accordingly, the residence and retention times applied to the BO may also be applied to the BO's attachments so that the attachments follow the BO to the long-term storage system after expiration of the residence time and destruction of the attachment occurs along with the BO at the expiration of the retention period. During archiving of the BO, the attachments may also be transferred to a long-term storage system and organized thereon in a manner similar to or corresponding to the organizational scheme used to store the BO. Thus, the attachments may be readily identified with the BO to which it relates without the need to store a separate link between the attachments and the BO. This provides for a simplified and efficient storage method that retains the association of the BO with its attachments. Further, any hold placed on the BO may also be applied to the attachments, preventing the attachments from being destroyed while the hold was in place. As such, the BO and any attachments are retained or destroyed together.

Referring again to FIG. 1, system 100 may be a distributed client/server system that spans one or more networks, such as network 110. In such implementations, data may be communicated or stored in an encrypted format using any standard or proprietary encryption algorithm, or the data may be in any open standard format. System 100 may be in a dedicated enterprise environment—across a local area network or subnet—or any other suitable environment without departing from the scope of this disclosure. The system 100 may include or be communicably coupled with a server 120, one or more clients 130, and network 110.

The server 120 may provide one or more applications 140 to the clients 130 or the one or more applications 140 may be resident locally at the clients 130. For example, this business application 140 can be any application, program, module, process, or other software that may change, delete, generate, or otherwise manage business information, such as BO 170, according to the present disclosure. In certain cases, system 100 may implement a composite application 140. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's NET. Application 140 may be a child or sub-module of another software module or enterprise application (not illustrated) without departing from the scope of this disclosure. Indeed, application 140 may be a hosted solution that allows multiple parties in different portions of the process to perform the respective processing. For example, client 130 may access application 140 on server 120, or even as a hosted application located over network 110 without departing from the scope of this disclosure.

More specifically, business application 140 may be an application built on other applications, that includes an object access layer (OAL) and a service layer. In this example, application 140 may execute or provide a number of application services, such as customer relationship management (CRM) systems, human resources management (HRM) systems, financial management (FM) systems, project management (PM) systems, knowledge management (KM) systems, and electronic file and mail systems. Such an object access layer is operable to exchange data with a plurality of enterprise base systems and to present the data to a composite application through a uniform interface. The example service layer is operable to provide services to the composite application. These layers may help composite application 140 to orchestrate a business process in synchronization with other existing processes (e.g., native processes of enterprise base systems) and leverage existing investments in the IT platform. Further, composite application 140 may run on a heterogeneous IT platform. In doing so, composite application 140 may be cross-functional in that it may drive business processes across different applications, technologies, and organizations. Accordingly, composite application 140 may drive end-to-end business processes across heterogeneous systems or sub-systems. Application 140 may also include or be coupled with a persistence layer and one or more application system connectors. Such application system connectors enable data exchange and integration with enterprise subsystems and may include an Enterprise Connector (EC) interface, an Internet Communication Manager/Internet Communication Framework (ICM/ICF) interface, an Encapsulated PostScript (EPS) interface, and/or other interfaces that provide Remote Function Call (RFC) capability. It will be understood that while this example describes the composite application 140, it may instead be a standalone or (relatively) simple software program. Regardless, application 140 may also perform processing automatically, which may indicate that the appropriate processing is substantially performed by at least one component of system 100. It should be understood that this disclosure further contemplates any suitable administrator or other user interaction with application 140 or other components of system 100 without departing from its original scope.

Figure 2:
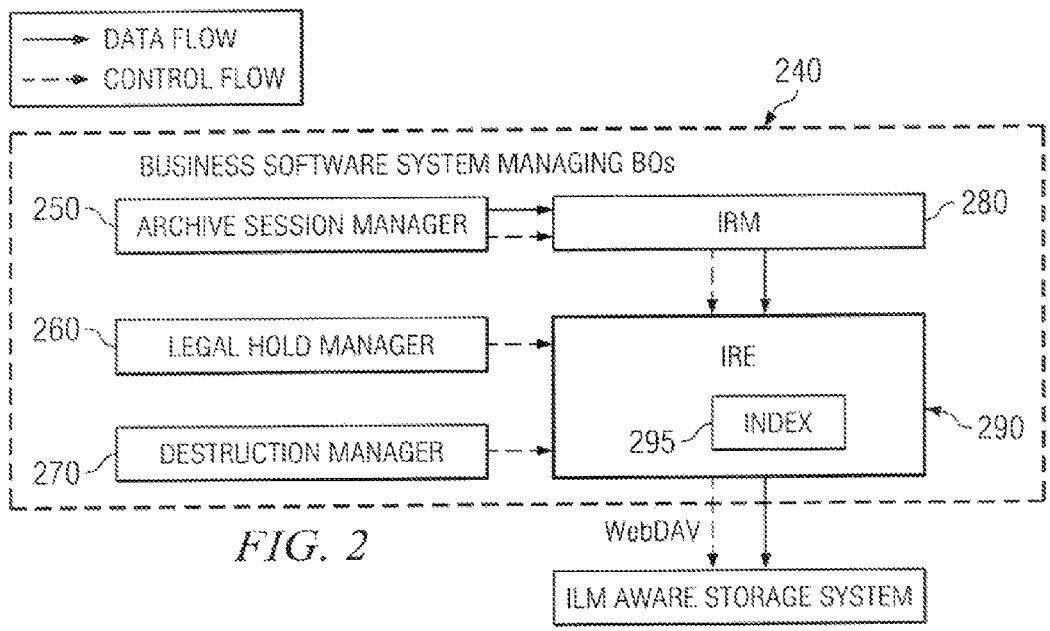
FIG. 2 is a configuration of the information retention management application in the system in FIG. 1.

FIG. 2 graphically illustrates an information retention management application ("IRMA") 240 for archiving data, such as BOs 170, according to one implementation. The IRMA 240 may include an Archive Session Manager ("ASM") 250, a Legal Hold Manager ("LHM") 260, a Destruction Manager ("DM") 270, an Information Retention Manager ("IRM") 280, and an Information Retention Executioner ("IRE") 290.

At a high level and according to one implementation, the DM 270 communicates with the IRE 290 to cause one or more BOs and any associated attachments to be destroyed, such as at the conclusion of the retention period. The IRM 280 may initiate archiving by, for example, executing one or more retention time rules to identify one or more BOs according, for example, to properties of the BOs. IRE 290 executes retention properties associated with the BOs as a result of the execution of the retention time rules. The IRE 290 may also function to transfer BOs identified by the IRM 280 from a primary system to a long-term storage system as described herein. The LHM 260 communicates with the IRE 290 to apply a hold, such as legal hold described in more detail below, to one or more BOs and any associated attachments.

The ASM 250 is used to call the IRM 280 to initiate the archiving process. The archiving process may begin when the BOs are queried and one or more of the BOs are identified and assigned an expiration date. The BOs may be queried and an expiration date assigned based on one or more retention time rules defined by a user or according to a default set of retention time rules. According to one implementation, the BOs are identified and the expiration date is assigned according to the BO's metadata or properties. As shown in FIG. 4, the BO 170 may contain one or more properties or metadata 10 describing the BO 170.

Returning to FIG. 1, the server 120 may include a processor 150, on which one or more applications, such as application 140 and IRMA 240, may reside and a local memory 190 that may store, at least partially, the BOs 170. The server 120 may also be coupled to the long-term storage system or repository 105 for storing archived data, for example. The clients 130 may include the processor 160 and a memory 200 and may also be coupled to a long-term storage system or repository 215, such as for storing data over a period of time. Repositories 105 and 215 may be any intra-enterprise, inter-enterprise, regional, nationwide, or substantially national electronic storage facility, data processing center, or archive that may provide dynamic storage of data, such as BOs 170, which may include any data related to, used, created, stored by, or otherwise associated with an application, such as the application 140.

The memory 190 may include a central database communicably coupled with one or more servers 120 and clients 130 via a virtual private network (VPN), SSH (Secure Shell) tunnel, or other secure network connection. The memory 190 may be physically or logically located at any appropriate location, so long as the memory 190 remains operable to store information and/or data associated with system 100 and communicate such information and/or data to server 120, or at least a subset of plurality of clients 130. Similarly, the memory 200 may be located at any appropriate location, so long as the memory 200 remains operable to store information and/or data associated with the system 100 and communicate the information and/or data to the client 130 and/or the server 120. The memories 190 and 200 may store the BOs 170 and may be centrally located and associated with one or more business modules that may be unrelated.

Memories 190 and 200 may include any memory or database module and may take the form of volatile or non-volatile memory including, without limitation, magnetic media, optical media, random access memory (RAM), read-only memory (ROM), removable media, or any other suitable local or remote memory component. Memory 190 may include application data (e.g., BOs 170) for one or more applications, as well as data involving VPN applications or services, firewall policies, a security or access log, print or other reporting files, HTML files or templates, related or unrelated software applications or sub-systems, and others. Consequently, memory 190 and 200 may also be considered a repository of data, such as a local data repository from one or more applications. Alternately or in addition to the memory 190, the memory 200 may be utilized exclusively or jointly to store application data (e.g., BOs 170) for one or more applications 140 that may be running jointly on one or more of the processors 160 and the processor 150, or exclusively on either one or more of the processors 160 or the processor 150.

Therefore, the clients 130 may be utilized remotely to use applications, such as application 140, provided on the server 120, for example. In such an implementation, the application 140 may access, use, create, store, or otherwise manipulate BOs 170 provided on the server in the memory 190. Alternately, the application 140 may use BOs 170 provided in the memory 200. Still further, the application 140 on server 120 may utilize BOs 170 provided on both the memories 190 and 200. According to other implementations, the application 140 may be provided on the client 130 alone or in combination with other parts of the application 140 on the server 120 or other clients 130. Thus, the application 140 provided at least in part on the client 130 may access, use, create, store, or otherwise manipulate BOs 170 located on the server 120 and/or the clients 130.

In some implementations, the BOs 170 (or pointers thereto) may be stored in one or more tables in a relational database described in terms of SQL statements or scripts. In another embodiment, the BOs 170 may be formatted, stored, or defined as various data structures in text files, XML documents, Virtual Storage Access Method (VSAM) files, flat files, Btrieve files, comma-separated-value (CSV) files, internal variables, or one or more libraries. In short, the BOs 170 may comprise one table or file or a plurality of tables or files stored on one computer or across a plurality of computers in any appropriate format. Indeed, some or all of the BOs 170 may be local or remote without departing from the scope of this disclosure and store any type of appropriate data. Moreover, the BOs 170 may be bundled and/or transmitted in a different format, other than a format in which the BOs were stored. In short, the BOs 170 may be provided or otherwise stored in one or more of the memories 190 and 200.

Processors 150 and 160 execute instructions and manipulate data to perform the operations of the server 120 and clients 130, respectively, and may be, for example, a central processing unit (CPU), a blade, an application specific integrated circuit (ASIC), or a field-programmable gate array (FPGA). Although FIG. 1 illustrates a single processor 150 and 160 in server 120 and clients 130, respectively, multiple processors 150 and 160 may be used according to particular needs, and reference to processor 150 and processor 160 is meant to include multiple processors 150 and 160 where applicable. In the illustrated embodiment, processors 150 and 160 may be utilized to execute application 140.

Referring again to FIG. 1, server 120 may also include interface 220 for communicating with other computer systems, such as clients 130, over network 110 in a client-server or other distributed environment. In certain embodiments, server 120 receives data from internal or external senders through interface 220 for storage in memory 190 and/or processing by processor 150. Generally, interface 220 comprises logic encoded in software and/or hardware in a suitable combination and operable to communicate with network 110. More specifically, interface 220 may comprise software supporting one or more communications protocols associated with communications network 110 or hardware operable to communicate physical signals.

Network 110 facilitates wireless or wireline communication between computer server 120 and any other local or remote computer, such as clients 130. Network 110 may be all or a portion of an enterprise or secured network. In another example, network 110 may be a VPN merely between server 120 and clients 130 across wireline or wireless link. Such an example wireless link may be via 802.11a, 802.11b, 802.11g, 802.20, WiMax, and many others. While illustrated as a single or continuous network, network 110 may be logically divided into various sub-nets or virtual networks without departing from the scope of this disclosure, so long as at least a portion of network 110 may facilitate communications between server 120 and at least one client 130. For example, server 120 may be communicably coupled to the repository 180 through one sub-net while communicably coupled to a particular client 130 through another. In other words, network 110 encompasses any internal or external network, networks, sub-network, or combination thereof operable to facilitate communications between various computing components in system 100. Network 110 may communicate, for example, Internet Protocol (IP) packets, Frame Relay frames, Asynchronous Transfer Mode (ATM) cells, voice, video, data, and other suitable information between network addresses. Network 110 may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments, network 110 may be a secure network accessible to users via certain local or remote clients 130.

Client 130 may be any computing device operable to connect or communicate with server 120 or network 110 using any communication link. At a high level, each client 130 includes or executes at least GUI 230 and comprises an electronic computing device operable to receive, transmit, process, and store any appropriate data associated with system 100. It will be understood that there may be any number of clients 130 communicably coupled to server 120. Further, "client 130" and "user" may be used interchangeably as appropriate without departing from the scope of this disclosure. Moreover, for ease of illustration, each client 130 is described in terms of being used by one user. But this disclosure contemplates that many users may use one computer or that one user may use multiple computers. As used in this disclosure, client 130 is intended to encompass a personal computer, touch screen terminal, workstation, network computer, kiosk, wireless data port, smart phone, personal data assistant (PDA), one or more processors within these or other devices, or any other suitable processing device. For example, client 130 may be a PDA operable to wirelessly connect with an external or unsecured network. In another example, client 130 may comprise a laptop computer that includes an input device, such as a keypad, touch screen, mouse, or other device that can accept information, and an output device that conveys information associated with the operation of server 120 or clients 130, including digital data, visual information, or GUI 230. Both the input device and output device may include fixed or removable storage media such as a magnetic computer disk, CD-ROM, or other suitable media to both receive input from and provide output to users of clients 130 through the display, namely, the client portion of GUIs or application interface 230.

GUI 230 comprises a graphical user interface operable to allow the user of client 104 to interface with at least a portion of system 100 for any suitable purpose, such as viewing application or other transaction data. Generally, GUI 230 provides the particular user with an efficient and user-friendly presentation of data provided by or communicated within system 100. For example, GUI 230 may present the user with the components and information that is relevant to their task, increase reuse of such components, and facilitate a sizable developer community around those components. GUI 230 may comprise a plurality of customizable frames or views having interactive fields, pull-down lists, and buttons operated by the user. For example, GUI 230 is operable to display certain data services in a user-friendly form based on the user context and the displayed data. In another example, GUI 230 is operable to display different levels and types of information involving data services based on the identified or supplied user role. GUI 230 may also present a plurality of portals or dashboards. For example, GUI 230 may display a portal that allows users to view, create, and manage historical and real-time reports including role-based reporting, and such. Of course, such reports may be in any appropriate output format including PDF, HTML, and printable text. Real-time dashboards often provide table and graph information on the current state of the data, which may be supplemented by data services. It should be understood that the term graphical user interface may be used in the singular or in the plural to describe one or more graphical user interfaces and each of the displays of a particular graphical user interface. Indeed, reference to GUI 230 may indicate a reference to the front-end or a component of a component manager, as well as the particular interface accessible via the one or more clients 130, as appropriate, without departing from the scope of this disclosure. Therefore, GUI 230 contemplates any graphical user interface, such as a generic web browser or touchscreen, that processes information in system 100 and efficiently presents the results to the user. Server 120 can accept data from the client 130 via the web browser (e.g., Microsoft Internet Explorer or Mozilla Firefox) and return the appropriate HTML or XML responses to the browser.

Figure 5:
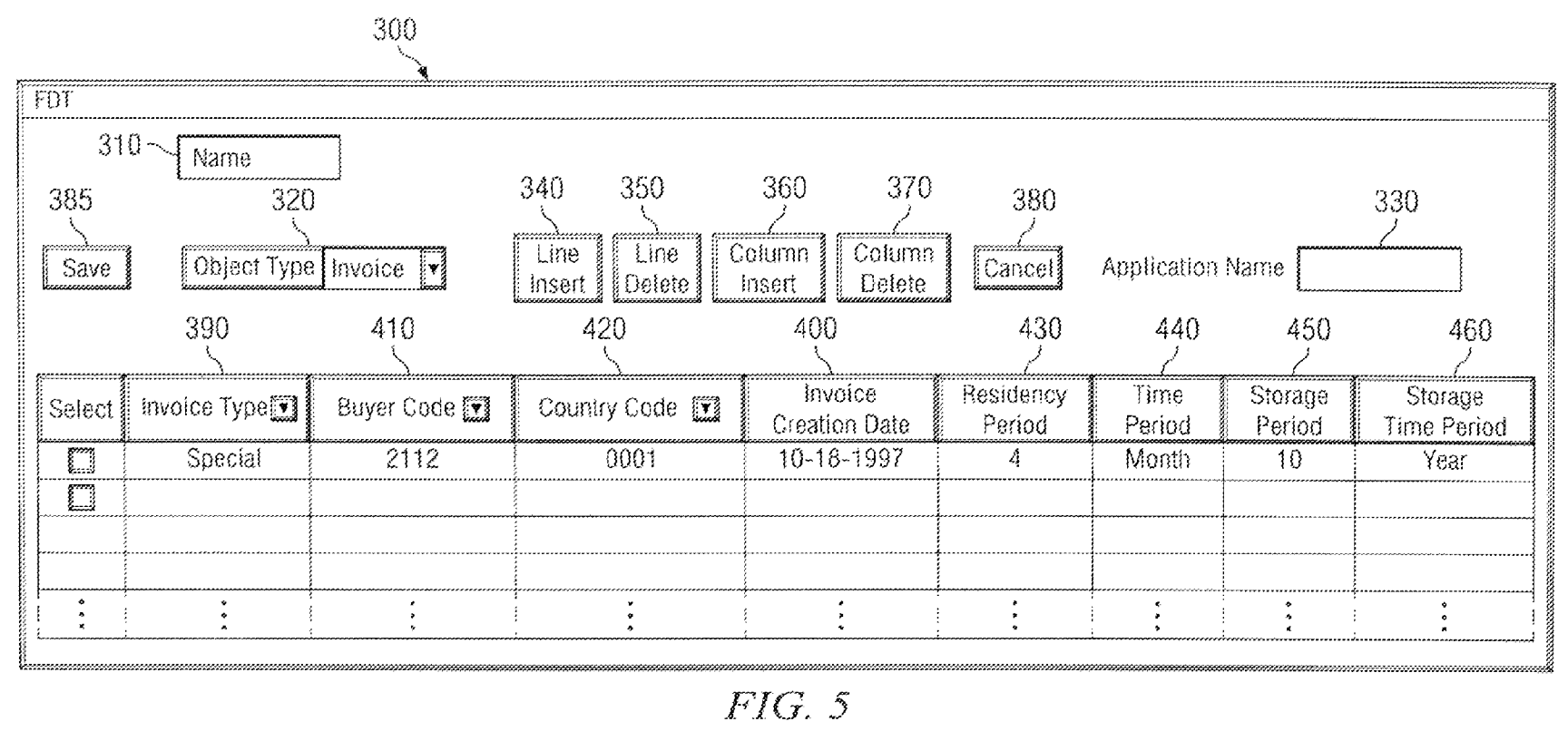

For example, FIG. 5 is a GUI 300 for defining which retention-relevant properties of the BOs are relevant to and, therefore, utilized to define the expiration date. According to one implementation, the GUI 300 represents a Formula Derivation Tool ("FDT"). The FDT includes a rule name field 310 for defining a name for a particular retention time rule. Another field 320 may be used to define a particular data type or BO to which the retention time rule is to apply. The field 320 may be a drop-down box of pre-populated data types or the field 320 may be a user-entered type. According to one implementation, the GUI 300 may not include the field 320 so that the defined retention time rule is generic and may be applied to any user-defined BOs. The FDT may also include field 330 to designate a particular application that created, used, modified, or otherwise used the particular BOs that are to be queried by the defined retention time rule. The GUI 300 may also include a Line Insert button 340 to insert a new line for defining another aspect of the retention time rule, a Line Delete button 350 for deleting a line of the retention time rule, a Column Insert button 360 for including a new BO property to be used to define the retention time rule, a Column Delete button 370 to remove a BO property used to determine BOs subject to the time retention rule, Cancel button 380 for canceling the rule without saving, for example, and a Save button 385 for saving a newly created or modified retention time rule, for example. It is within the scope of the present disclosure, though, to have additional or fewer buttons to perform more or different functions, depending on the needs or desires of the user.

As shown in FIG. 5, the example GUI 300 includes the fields 390, 400, 410, and 420 corresponding to BO properties Invoice Type, Invoice Creation Date, Buyer Code, and Country Code that are used to defined the retention time rule. According to one implementation, the BO properties used to define the retention time rule may be selected from a pull-down list provided in the respective column or may be entered by the user via an input device, such as a keyboard, for example. However, the retention time rule may be created using more, fewer, or different BO properties than those shown and/or described. Each field used to define the retention period rule may be defined by the user such as by selecting a field and entering a value. Defining archiving properties of BOs utilizing one or more retention-relevant properties is useful, especially for data that may span multiple countries, for example, because the laws of different countries may require different periods of retention of data. Thus, such a system and method permits the filtering, identification, and retention of BOs for different periods of time corresponding to different legal standards.

Once all of the query criteria has been defined, the user may define the residency and retention periods, although, the storage criteria may be defined prior to or concurrently with the query criteria. Further, the retention time rule may define a retention period and not a residency period. As illustrated, the retention period rule defined by GUI 300 includes the additional fields of Residency Period 430, Residency Time Period 440, Storage Period 450, and Storage Time Period 460. The Residency Period field 430 may define the period the qualifying BOs remain in the primary system, and the Residency Time Period Field 440 may define the unit of time to apply to the time duration entered in the Residency Period field 430. For example, if the entry in the Residency Period field 430 is the number "4," the Residency Time Period Field 440 may contain the entry "month," indicating that the qualifying BOs are to be retained in the primary system for four months. Similarly, the Storage Period 450 may define the quantitative period the qualifying BOs are to be retained in the archival system after the BOs have been transferred to the archival system and the Storage Time Period field 460 may define the time unit applicable to the entry in the Storage Period field 450. As shown, the BOs defined by the query are to be retained in the archival system 10 years. Once the retention time rule has been defined or modified, the rule may be saved by selecting the Save button 385.

After defining and saving a retention time rule, the rule may be executed to identify all BOs satisfying the rule's criteria. Once identified, the BOs satisfying the rule shown in FIG. 5 are retained in the primary system for four months, which may be from the date of running the query or from the date of the invoice's creation, identified in field 400. After the end of the residency period, the BOs are transferred to an archival system, such as long-term storage systems 105 and/or 215 (shown in FIG. 1) and are retained there, such as in an immutable state, for 10 years (the period defined by fields 450 and 460).

Alternately, rather than including the fields 430 through 460, GUI 300 may include a Start of Retention field (not shown), designating when BOs satisfying the query criteria are to be transferred to an archive to begin the immutable storage period, for example. The input entered into the Start of Retention field may be a date designating the date on which the BOs are to be transferred to the archival system, such as long-term storage systems 105, 215. The GUI 300 may also include an Expiration Date field (also not shown), which is the date on which the data may be destroyed. The retention time applied to one or more BOs may be undefined (or infinite) if the information is to be retained indefinitely or if no retention period is yet available. The rule may later be amended to include a retention period, and an indefinite retention period already applied to one or more archived BOs may be subsequently modified.

Figure 14:
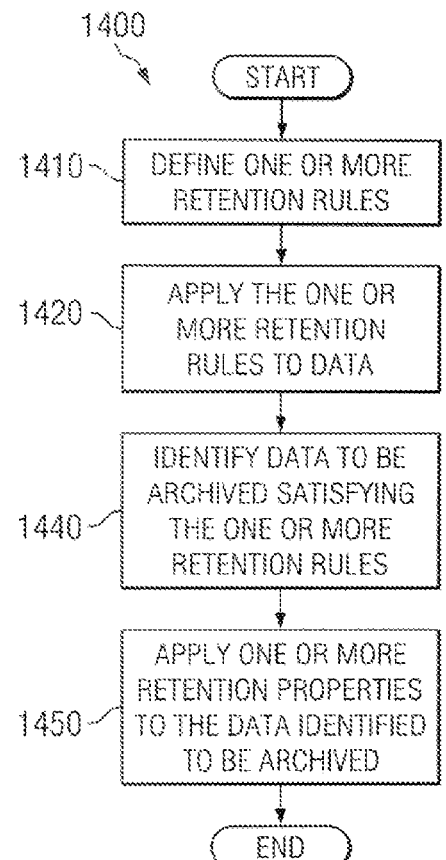
FIG. 14 is a flow diagram illustrating an example method for identifying data satisfying one or more retention rules.

FIG. 14 illustrates a flow diagram of a method 1400 for identifying data for archival and applying retention-related information to the data, according to some implementations. At 1410, one or more retention rules is defined. At 1420, the one or more retention rules is applied to one or more data instances, such as one or more BOs. At 1430, the data instances satisfying the conditions or designations of the one or more retention rules are identified, and, at 1440, retention properties corresponding to the one or more retention rules are assigned to the identified data instances satisfying the one or more retention rules. Other implementations may include more, fewer, or different steps, as described herein. The method 1400, as shown and described, is merely one possible method within the scope of the present disclosure.

Referring again to FIG. 2, the retention time rules may be utilized by the IRM 280. According to one implementation, once one or more retention time rules are defined, the ASM 250 calls the IRM 280 to execute one or more time retention rules. A BO type on which the one or more retention time rules are to be applied may be inputted, and the BOs satisfying the query criteria are identified. The retention-relevant properties defined by the retention time rule, the corresponding values of the retention-relevant properties, and the applicable expiration date may be returned. Further, the retention-relevant properties may be utilized to define a naming scheme or hierarchical path for storing the BOs in the archival system. Referring again to FIG. 4, the invoice BO 170 includes retention-relevant properties identified by an asterisk (*). However, retention-relevant properties may include more, fewer, or different properties than those illustrated. As described above, the retention-relevant properties are used by the retention time rule to identify and define a retention period for one or more BOs. Once the retention-relevant properties are defined in a retention time rule and the corresponding BOs are identified, the retention-relevant properties, at least in part, define the hierarchal path 470.

As shown in FIG. 4, for a retention time rule using the properties invoice type ("special"), invoice creation date ("10-18-2010"), country code ("0001"), and buyer code ("2112"), the corresponding hierarchical path 470 is: /.../.../ special/0001/10182010/2112/Run1/. The ellipses at the beginning of the hierarchical path 170 represent a path prefix (i.e., other path nodes that may or may not be included in order to completely define the hierarchical path as required or desired). The last node of the hierarchical path, i.e., "Run1," represents a session identifier. For example, the session number represents a particular session during which the stored data were archived. However, the session number may be omitted. Further, all or fewer of the retention-relevant properties may be used to define the hierarchical path. Moreover, an expiration date (i.e., the date the data are to be destroyed)

may also be included as a node of the hierarchical path. Thus, the expiration date of the data contained under the hierarchical path may be readily determined with reference to the hierarchical path. The hierarchical path may be used to apply retention policies in meaningful units at a later time. The hierarchical path defines a physical storage location under which all BOs satisfying the terms of the retention time rule are stored when transferred to the archival system. Thus, according to one implementation, the archived data are maintained in an easy-to-understand hierarchy based on business-oriented retention criteria. Consequently, the hierarchical path defined in this manner provides a self-explanatory, long-term storage scheme such that a user may look at the data as organized and understand what data are grouped and how the data are grouped.

Referring again to FIG. 2, once a group of BOs have been identified by the IRM 280, the BOs may be retained in the primary system until the residency period has elapsed or a date defining the end of the residency period has occurred or the date defining the beginning of the retention period has occurred. Once one of these events has occurred, the IRM 280 calls the IRE 290. According to one implementation, the IRE 290 reads the identified BOs and the corresponding hierarchical path. The IRE 290 searches the long-term storage system (such as long-term storage system 105 and/or 215) and determines whether the hierarchical path already exists. If the hierarchical path does not exist, the IRE 290 creates the hierarchical path and transfers the BOs from the primary system 100 thereto. The expiration date determined by the IRM 280 is then associated with the stored BOs, such as by attaching the expiration date to one or more of the nodes of the hierarchical path. For example, the expiration date may be stored in the leaf node of the hierarchical path. Alternately, the expiration date may be included with the BOs as metadata. For example, the expiration date may be saved to the BOs as a property using metadata. After transferring the BOs to the long-term storage system, the BOs may be deleted from the primary system. Further, the IRE 290 may create an index 295 of the BOs contained in the hierarchical path. The index may be used to run queries of the stored BOs, such as to place a legal hold (described in more detail below) on one or more of the BOs. Additionally, the index may be utilized by the DM 270 to destroy the archived BOs. For example, when the expiration date associated with one or more archived BOs transpires, the DM 270 instructs the IRE 290 to destroy all BOs to which the expiration date applies. The BOs are then destroyed and, according to some implementations, the BOs are destroyed such that the BOs may not be recovered.

An expiration date determined by the IRM 280 may be applied to one or more BOs corresponding to a retention time rule, described above. In addition, application of an expiration date may be applied to a compilation of BOs. In such a circumstance, the expiration date is propagated to all of the BOs of the compilation. Put another way, the BOs of a compilation inherit the expiration date applied to the compilation. Other properties applied to a compilation may be applied to the associated BOs in a similar manner. For example, a legal hold may be applied to all of the progeny of a compilation via propagation. A legal hold is a designation applied to one or more archived BOs that overrides the applied expiration date and prevents the BO from being destroyed when the expiration date transpires. For example, a legal hold may be placed on one or more BOs or a compilation of BOs when the BOs may be needed for a legal proceeding, such as pending or foreseeable litigation. Other holds for preventing the execution of the expiration date may be included for any other purpose. According to the implementation shown in FIG. 2, when a legal hold is to be applied, a user may define the criteria for determining BOs to which the legal hold is to apply. The LHM 260 utilizes the criteria to search the IRE 290 to search the created index, for example, with the defined criteria. Once the BOs are identified, the IRE 290 associates the legal hold with the BOs. The legal hold may be applied to one or more of the hierarchical path nodes and may be propagated to the BO progeny of a compilation. A legal hold may later be removed in a similar manner. Once removed, the expiration date once again becomes effective. For example, if the expiration date has transpired during the application of a legal hold, the BO is destroyed immediately upon removal of the legal hold. On the other hand, if the expiration date has not yet transpired, the BO remains archived once the legal hold is removed, and the BO is destroyed upon the occurrence of the expiration date. Both cases presume there are no other holds applicable at the time the legal hold is removed. If other holds are present on the BOs, the expiration date would be ineffective until the other holds were subsequently removed. A legal hold may include one or more "case" elements that may be used to describe the nature or purpose of the legal hold.

FIGS. 7-11 show screen shots of a GUI 700. The GUI 700 is typically used to view (but may be used to add, modify, or remove) properties, such as a legal hold, for example, from one or more archived BOs, according to one or more implementations. FIGS. 7-11 illustrate the addition of legal holds to a compilation provided at the hierarchical path 710. In some cases, the start of retention property and the expiration property is derived from the rules in the IRM 280, while the legal hold properties can be manipulated by a corresponding GUI in the LHM 260. The GUI 700 includes a Tag column 720 containing names of various properties applicable to one or more archived BOs. A Namespace column 730 indicates the path location where a particular property is stored, and a Value column 740 indicates a value of a particular property. For example, the compilation identified at path 710 includes, inter alia, a "start_of_retention" property having a value of "2010-12-31" and an "expiration date" property having a value of "2020-12-31." Consequently, the BOs contained in the compilation have been archived on or after Dec. 31, 2010 and will be destroyed on or after Dec. 31, 2020. The GUI 700 also includes an Add button 750 for adding a one or more new properties, a Delete button 760 for deleting one or more properties, a Save button 770 for saving any additions, deletions, or modifications to the properties, and a Close button 780 for closing GUI 700. Note that, in some cases, it may be possible to add new properties within the IRE 290 and delete them afterwards, but it may not be possible to delete properties set by the IRM and the LHM. It is within the scope of the present disclosure, though, to have additional or fewer buttons to perform more, fewer, or different functions, depending on the needs or desires of the user.

Figure 8:
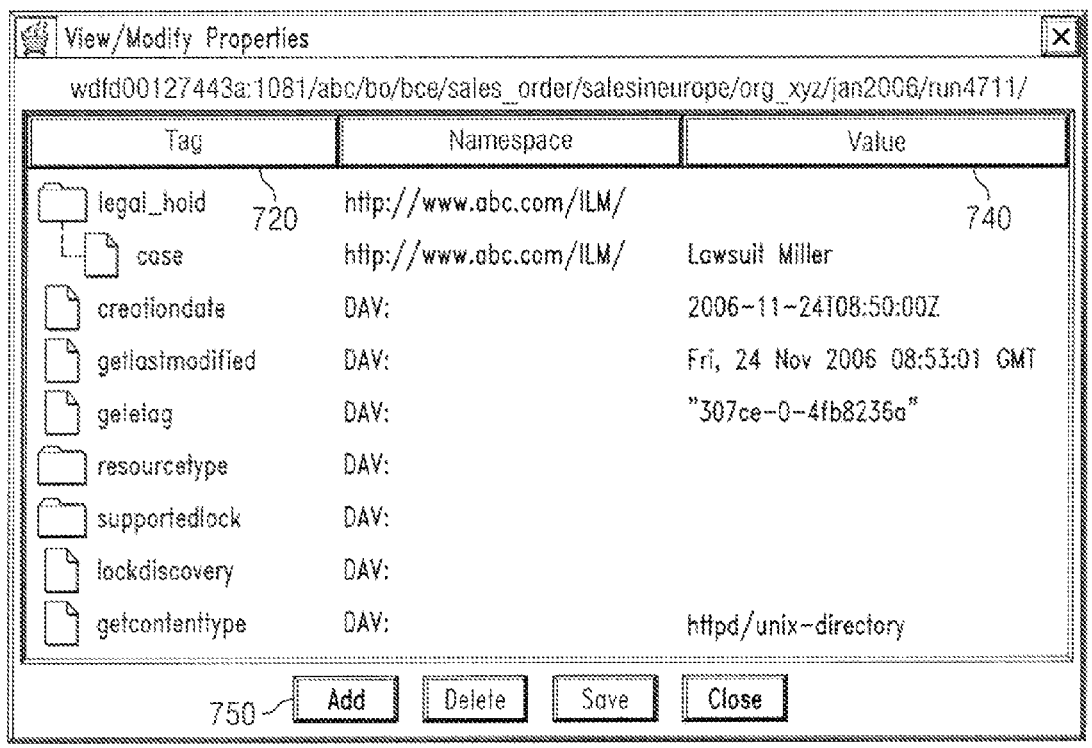

FIG. 8 shows the addition of a legal hold. The legal hold may be added by selecting the Add button 750. According to the implementation illustrated, the addition of a legal hold creates a "legal_hold" tag or folder, listed under the Tag column 720. Each legal hold applicable to the compilation of BOs is shown as a branch (identified with the term "case") from the "legal_hold" tag. Each legal hold may include an identifier and may be described with a case element value, shown in the Value column 740. For example, the legal hold shown in FIG. 8 has a case element value of "Lawsuit Miller." Thus, the case element of the legal hold may provide a brief reference as to the purpose or nature of the legal hold.

Figure 11:
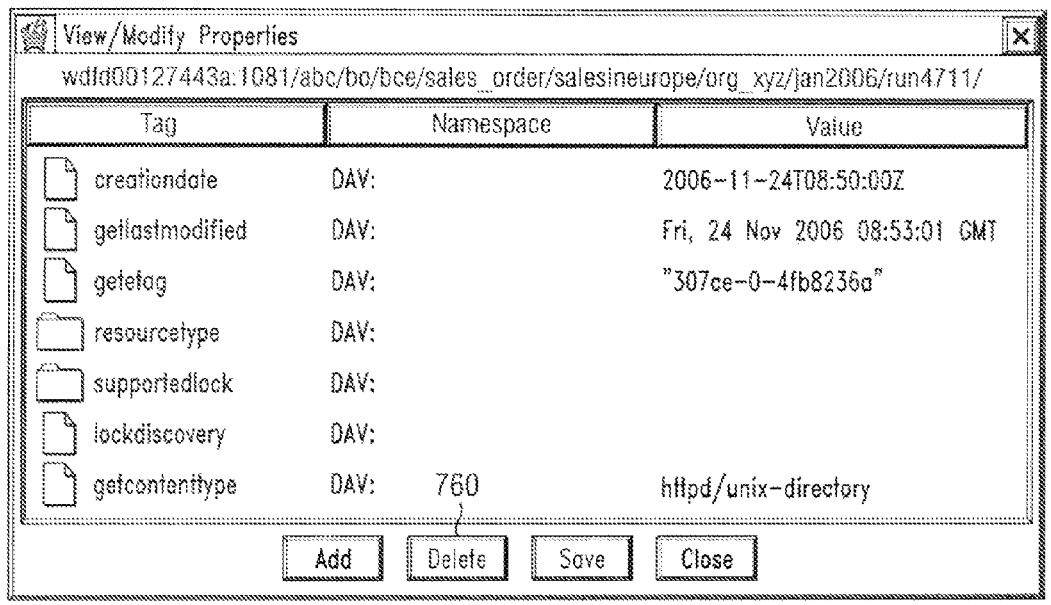

FIG. 9 shows the addition of a second legal hold, also shown as a branch from the "legal_hold" tag in the Tag column 720. The second legal hold is identified with a case element value of "Tax proceedings." Again, the additional legal hold may be added with the Add button 750. FIGS. 10 and 11 illustrate the removal of the two legal holds added in FIGS. 8 and 9. The legal holds may be removed by, for example, selecting the legal holds, either together or separately, and selecting the Delete button 760.

According to some implementations, once an expiration date is applied to the archived BOs, although the expiration date may be modified, the expiration date may not be shortened. Thus, according to such implementations, the expiration date may only be lengthened. Application of a change to an expiration date may be accomplished in a manner similar to the application of a legal hold, described above. That is, a user may identify criteria describing BOs for which an expiration date needs to be changed. The criteria is utilized to search the index of the archived BOs, and the expiration date of any qualifying BOs is changed. Such a change may also be applied by propagation, as described above. Relatedly, a change applied via propagation (i.e., applying a change to a compilation) may be applied to some of the progeny and not to others, for example, when the change is a modification of an expiration date that would have an effect to shorten the expiration date of some of the progeny but not all. The expiration date is an example of a property that may, in some circumstances, only be changed via the IRM.

Figure 6:
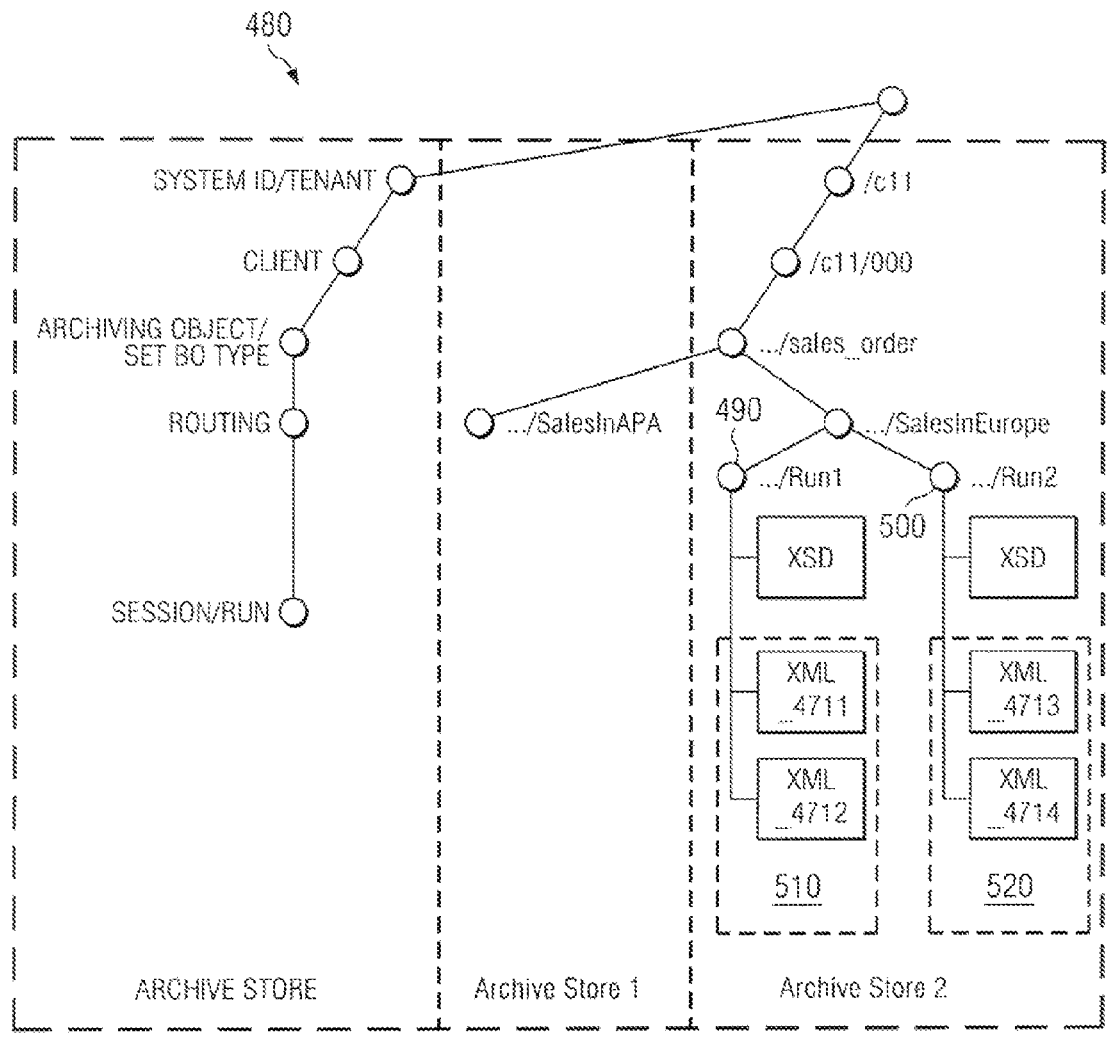
FIG. 6 shows an example archive hierarchy according to one implementation.
Figure 7:
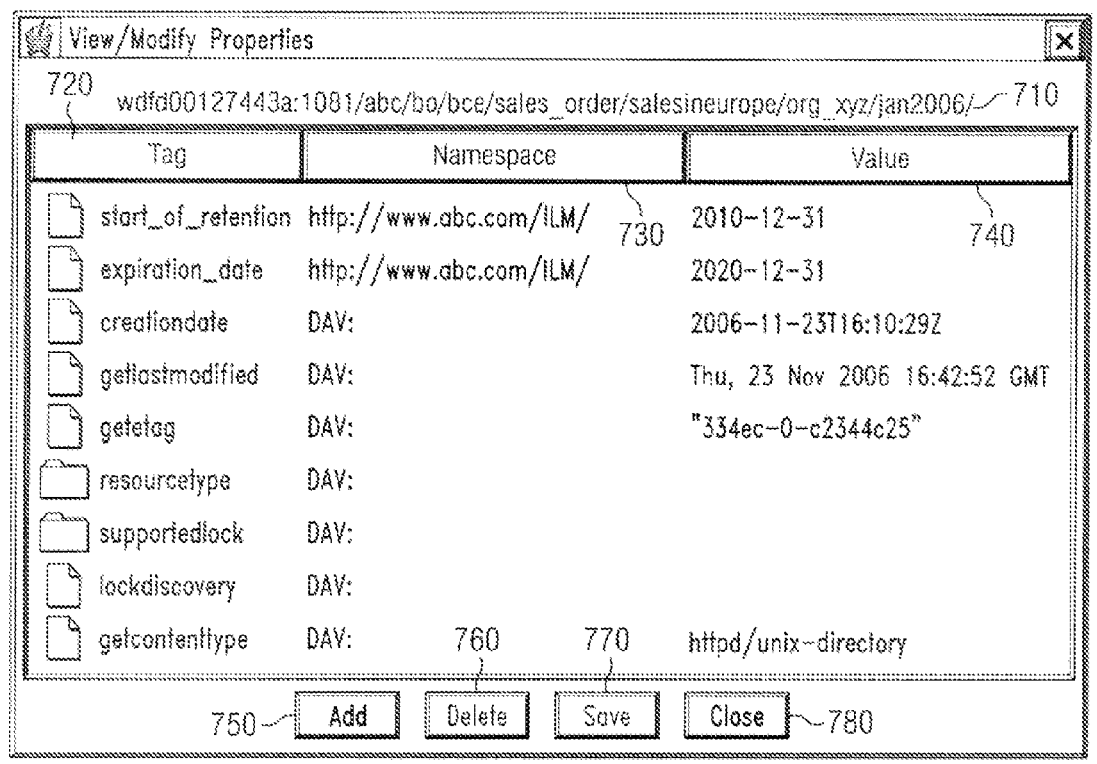

FIG. 6 illustrates an example archive hierarchy 480. Among other things, the archive hierarchy 480 includes two compilations 490, 500 of archived data. The compilation 490 has a hierarchical path of: /c11/000/sales_order/SalesinEurope/Run1/, wherein node Run1 may be the session identification during which the data contained in the compilation 490 was identified. The compilation 500 has a hierarchical path of: /c11/000/sales_order/SalesinEurope/Run2/. The information or BOs 510, 520 corresponding to the respective compilations are stored in the respective hierarchical paths.

Additionally, the IRE 290 may store the BOs using an open standard. Maintaining the stored BOs in an open standard permits reading the contents of the stored BOs while stored in the long-term storage system during the retention period. Thus, if the BOs are originally maintained in a proprietary format prior to archiving and thereafter stored in the proprietary format during the retention period, it would be impossible or very difficult and costly to determine the contents of the stored BOs. Such a problem may arise, for example, if the application that utilized the BOs in a proprietary format is no longer in use. As a result, reading the BOs in the proprietary format becomes problematic, especially if the data is needed, such as in a legal matter, at some later time.

Further, an open standard protocol may be utilized to store the BOs. One open standard that may be utilized is WebDAV (Web based Distributed Authoring and Versioning). WebDAV is only an example, and other open standards are included within the scope of the present disclosure.

Referring again to FIG. 2, destruction of the archived BOs occurs when the expiration date transpires. According to some implementations, the DM 270 determines whether the expiration date of one or more BOs has transpired. For example, the DM 270 may cause the IRE 290 to perform a review of the expiration dates associated with BOs contained on the long-term storage system. The IRE 290 may perform such a review at regular intervals, such as once a day, week, or month. Alternately, the expiration date associated with the BOs contained on the long-term storage system may be included with the index 295. When the DM 270 determines that the one or more expiration dates have expired, the DM 270 causes the IRE 290 to destroy the associated BOs. For example, the IRE 290 may call the WebDAV protocol delete function to destroy the associated BOs. As indicated above, the destroy operation will only be allowed when there are no holds applied to the expired BOs. According to some implementations, the BOs are destroyed in such a manner that they are not recoverable.

Because related BOs subject to the same expiration date are already grouped in the same hierarchical path, a potentially large quantity of expired BOs are quickly identified due to the efficient bundling. Consequently, destruction of the expired BOs is performed efficiently, saving computing time and dramatically reducing network traffic because a response from every conceivable application whose BOs are subject to the IRM 280 and IRE 290 is not needed.

Figure 15:
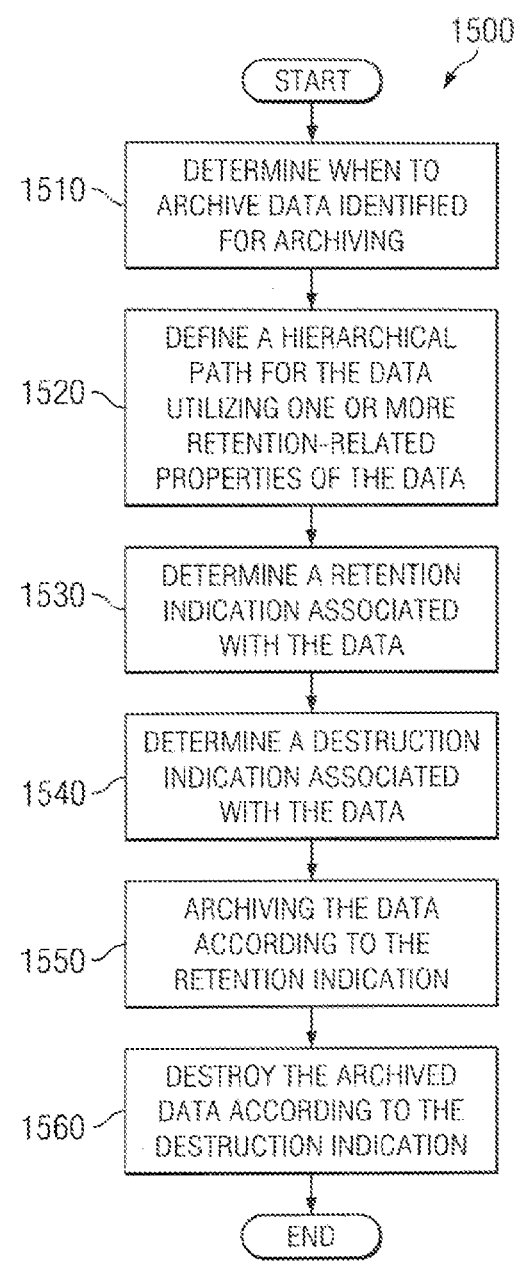
FIG. 15 is a flow diagram illustrating an example method for enforcing retention properties assigned to data identified for archiving and/or subsequently archived.

FIG. 15 illustrates a flow diagram of a method 1500 for enforcing retention properties, such as a date or time at which the data are to be transferred to an archive and an expiration date when the archived data are to be destroyed. At 1510, the retention properties, such as a retention indication (e.g., a retention time or date) and a destruction indication (e.g., an expiration time or date), of data scheduled for archiving are determined. At 1520, a hierarchical path under which the data is to be stored on a long-term storage system is defined. At 1530, the retention indication of the data scheduled for archiving is identified, such as with reference to the retention date or time associated with the data. At 1540, the destruction indication, associated with the data, is identified. At 1550, the data are archived according to the retention indication, and, at 1560, the data are destroyed according to the destruction indication. Other implementations of the method 1500 may include more, fewer, or different steps, as described herein. The method 1500, as shown and described, is merely one possible method within the scope of the present disclosure.

BOs, such as the BO 170 shown in FIG. 4, may be considered structured data because the information contained in the BO 170 is provided in a structured manner. However, a BO may also have associated therewith unstructured data, e.g., graphics, documents, attachments, e-mails, etc., that may be retained with the BO. For example, for a BO that contains information regarding an employee, the BO may have unstructured data including employee appraisals, the employee's original application, resume, and other employee-related information. When the BO is archived according to the present disclosure, the related unstructured data may also be archived in a manner that the unstructured data retains the association with the structured data (i.e., the BO).

Figure 13:
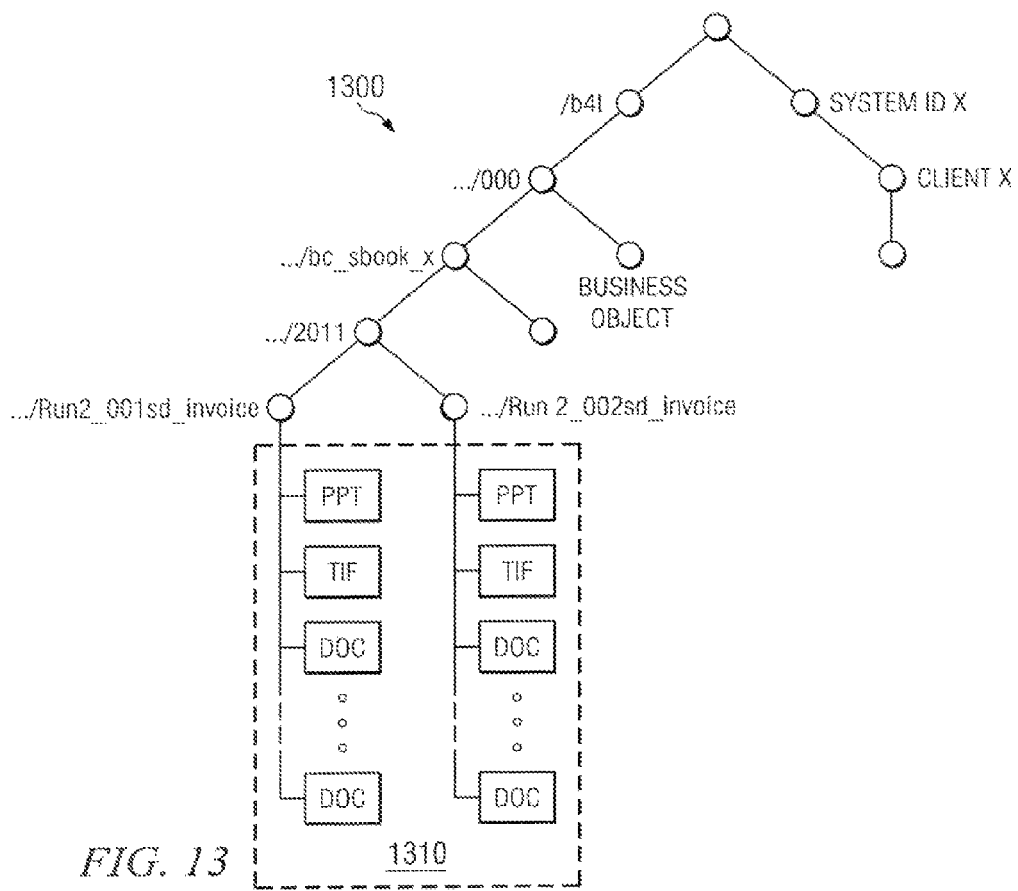
FIG. 13 shows an archive hierarchy used to organize unstructured data associated with structured archived data.
Figure 12:
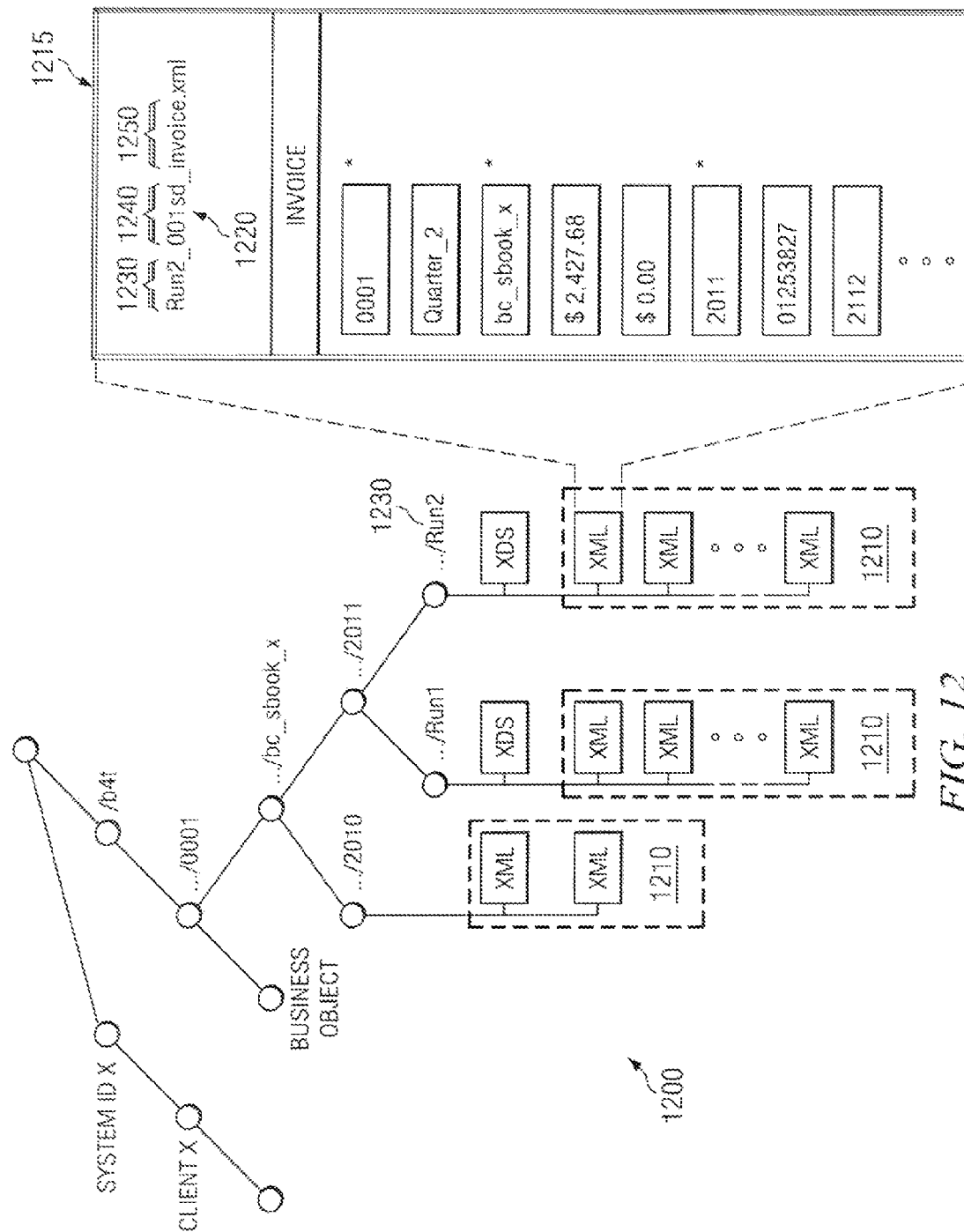
FIG. 12 shows a second example archive hierarchy used to organize structured archived data.

FIGS. 12 and 13 respectively illustrate an archival hierarchy for structured data and unstructured data associated with the structured data. To store the unstructured data while maintaining an association with the structured data, the unstructured data is stored in the long-term storage system utilizing a hierarchical path similar to the hierarchical path utilized to store the structured data. FIG. 12 illustrates an archival hierarchy 1200 of archived BOs 1210 (structured data). An exemplary BO 1215 is illustrated in graphical detail. The BO 1215 includes an identifier 1220. According to some implementations, the identifier 1220 includes the session identifier 1230 and a BO identifier 1240. The identifier 1220 may also include other information required or desired, such as a BO description 1250. Some properties 1260 of the BO 1215 are also illustrated, where the retention-relevant properties, utilized to define the hierarchical path, are identified with an asterisk (*). FIG. 13 illustrates the archival hierarchy 1300 for storing unstructured data 1310 associated with the structured data (BOs 1210). As shown, the hierarchical path utilized for storing the unstructured data 1310 is similar to the hierarchical path utilized for storing the structured data (BOs 1210). That is, the hierarchical path for the unstructured data 1310 is defined with the retention-relevant properties of the associated BO 1210. As shown, the hierarchical path for the BO 1215 is: /b4t/0001/bc_sbook_x/2011/Run2/. Correspondingly, the hierarchical path for the associated unstructured data 1310 is: /b4t/0001/bc_sbook_x/2011/Run2__001sd_invoice/. Thus, the identifier 1220 of the BO 1215 is used as part of the hierarchical path of the unstructured data associated with the BO 1215. Storing the structured data and unstructured data in the manner described above retains the association of the unstructured data to the structured data without the need to store a separate link relating the unstructured data to the structured data, and the relationship between the structured and unstructured data is identifiable even if the application utilizing the structured data is no longer in use. Consequently, this reduces complexity and more efficiently utilizes storage space.

Further, when one or more BO's expiration date has expired, any associated unstructured data is readily identifiable as a result of the archival scheme described above. Thus, the expiration date of the BOs may be applied to the associated unstructured data, and both the BOs and the associated unstructured data may be destroyed together when the expiration date transpires (barring the application of a hold, such as a legal hold, for example). Thus, not only does a BO's expiration date apply to the associated unstructured data, any hold applicable to the BO, such as a legal hold, is also applied to the associated unstructured data. This prevents destruction of the associated unstructured data when the BO is being prevented from destruction for some purpose, such as a legal proceeding or other reason. Moreover, any and/or all retention properties applicable to the structured data may be applied to the related unstructured data, such as by applying the retention properties to a node of the hierarchical path of the unstructured data, and any changes to the retention properties of the structured data may also be applied to the unstructured data. According to some implementations, changes to the retention properties of the structured data may be applied to any related unstructured data by determining whether the hierarchical path for the unstructured data exists. If so, the changes are applied. If the hierarchical path of the unstructured data does not exist, this is an indication that there is no unstructured data associated with the particular structured data and nothing further is required.

Figure 16:
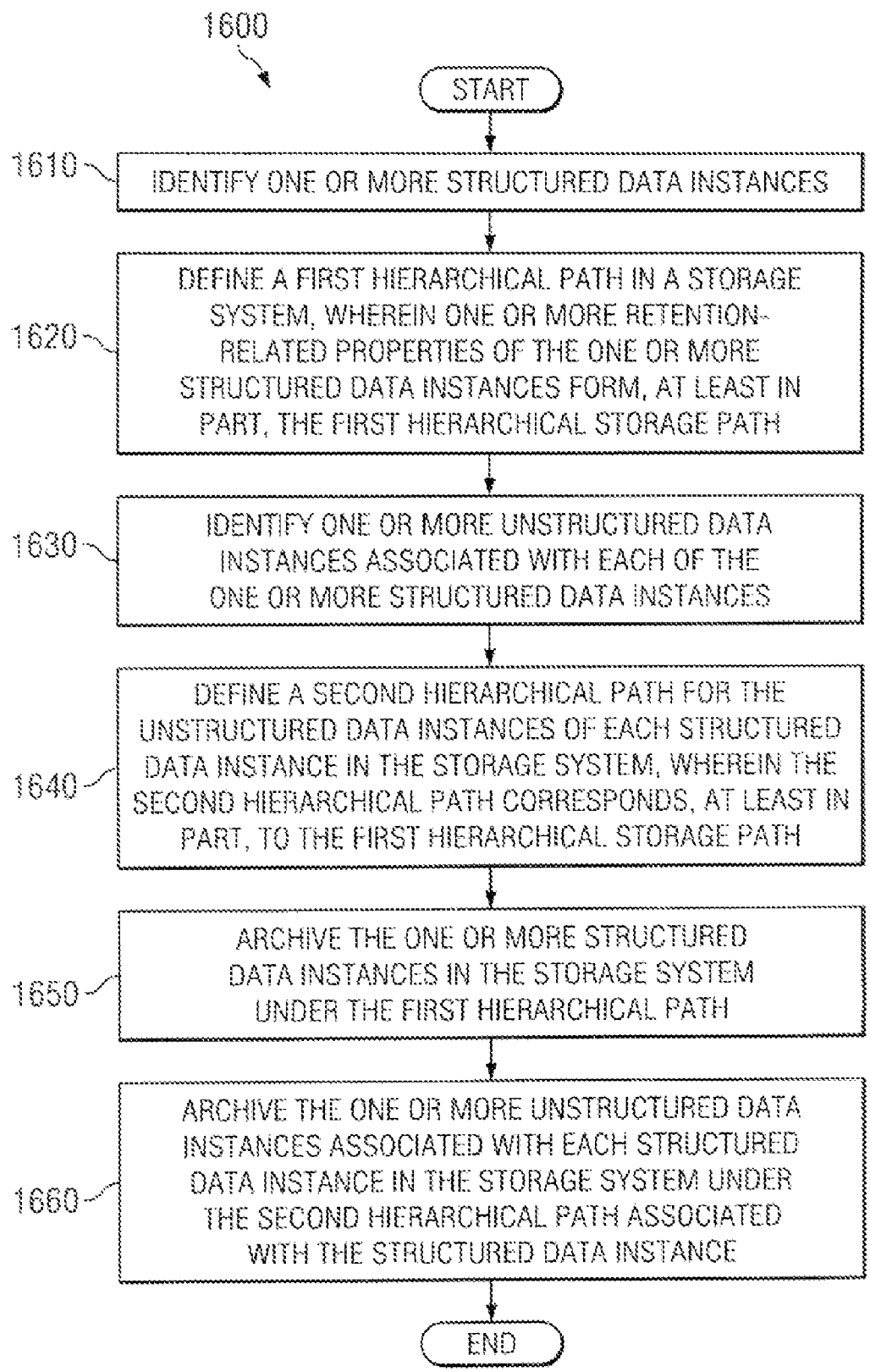
FIG. 16 is a flow diagram illustrating an example method for retaining an association between structured data and unstructured data during and after archival.

FIG. 16 shows a flow diagram of a method 1600 for retaining an association between structured data and the associated unstructured data, according to some implementations. At 1610, one or more instances of structured data are identified, such as by applying one or more retention time rules. At 1620, a first hierarchical path is defined. The first hierarchical path may be described using one or more of the retention-related properties of the structured data. At 1630, the unstructured data associated with the identified structured data are identified, and, at 1640, a hierarchical path for the associated unstructured data is defined. As described above, the hierarchical path for the unstructured data is closely related to the hierarchical path for the corresponding structured data. At 1650, the structured data is archived in a storage system, such as a long-term storage system, under the first hierarchical path, and, at 1660, the associated unstructured data is archived in the storage system under the second hierarchical path. It will be understood that inheritance of an archive path may also be applied to structured data that is associated with a business object. In such cases, the additional structured data may inherit both retention rules and a major part of the hierarchical path. Other implementations may include more, fewer, or different steps, as described herein. The method 1600, as shown and described, is merely one possible method within the scope of the present disclosure.

A number of implementations of the invention have been described. Nevertheless, it will be understood that various modifications may be made without departing from the spirit and scope of the invention. Accordingly, other implementations are within the scope of the following claims.

What is claimed is:

1. A computer implemented method for archiving structured and associated unstructured data comprising:
   identifying a structured data object to be archived, the data object associated with one or more retention rules;
   defining, in a storage system, a first target hierarchical path for the identified data object;
   identifying two or more unstructured data instances associated with the identified data object;
   defining, in the storage system, a second target hierarchical path for a first of the identified unstructured data instances associated with the identified structured data object, wherein the second hierarchical storage path corresponds, at least in part, to the first hierarchical storage path;
   archiving the structured data object into an archive object in the storage system at the first hierarchical path, the archive object associated with one or more retention rules; and
   archiving the first particular unstructured data instance in the storage system at the second hierarchical path, wherein archiving the first particular unstructured data instance comprises storing the first particular unstructured data instance as a first node at the second hierarchical path;
   archiving a second unstructured data instance associated with the identified data object in the storage system at the second hierarchical path, wherein archiving the second unstructured data instance comprises storing the second unstructured data instance as a second node at the second hierarchical path; and
   automatically propagating the one or more retention rules to the first particular unstructured data instance and the second unstructured data instance.

2. The method of claim 1, wherein identifying the structured data object comprises comparing one or more properties of the structured data object with the one or more retention rules.

3. The method of claim 1 further comprising effecting any changes to the one or more retention rules associated with the structured data object to the first particular unstructured data instance anti the second unstructured data instance.

4. The method of claim 1 further comprising:
   defining, in the storage system, a third target hierarchical path for a third identified unstructured data instance associated with the identified data object, wherein the third hierarchical storage path corresponds, at least in part, to the first and second hierarchical storage paths; and
   archiving the third identified unstructured data instance in the storage system at the third hierarchical path.

5. The method of claim 1 further comprising destroying the archive object according to a destruction indication.

6. The method of claim 5, the destruction indication comprising expiration of the one or more associated retention rules.

7. The method of claim 5 further comprising automatically destroying the first particular unstructured data instance and the second unstructured data instance in the storage system at the second hierarchical path.

8. The method according to claim 1 further comprising incorporating an identifier of the identified structured data object into the second storage path of the first particular unstructured data instance.

9. The method of claim 1, the identified structured data object comprising a business object and the first particular unstructured data instance comprising a business document associated with the business object.

10. A computer program product encoded on a tangible storage medium, the product comprising computer-readable instructions for causing one or more processors to perform operations comprising:
   identify a structured data object to be archived, the data object associated with one or more retention rules;
   define, in a storage system, a first target hierarchical path for the identified data object;
   identify two or more unstructured data instances associated with the identified data object;
   define, in the storage system, a second target hierarchical path for a first one of the identified unstructured data instances associated with the identified structured data object, wherein the second hierarchical storage path corresponds, at least in part, to the first hierarchical storage path;
   archive the structured data object into an archive object in the storage system at the first hierarchical path, the archive object associated with one or more retention rules;
   archive the first particular unstructured data instance in the storage system at the second hierarchical path, wherein archiving the first particular unstructured data instance comprises storing the first particular unstructured data instance as a first node at the second hierarchical path;
   archive a second unstructured data instance associated with the identified structured data object in the storage system at the second hierarchical path, wherein archiving the second unstructured data instance comprises storing the second unstructured data instance as a second node at the second hierarchical path; and
   automatically propagate the one or more retention rules to the first particular unstructured data instance and the second unstructured data instance.

11. The computer program product of claim 10, wherein identifying the structured data object comprises comparing one or more properties of the structured data object with the one or more retention rules.

12. The computer program product of claim 10 further operable to effect any changes to the one or more retention rules associated with the structured data object to the particular unstructured data instance.

13. The computer program product of claim 10 further operable to:
   define, in the storage system, a third target hierarchical path for a third identified unstructured data instance associated with the identified data object, wherein the third hierarchical storage path corresponds, at least in part, to the first and second hierarchical storage paths; and
   archive the third identified unstructured data instance in the storage system at the third hierarchical path.

14. The computer program product of claim 10 further operable to destroy the archive object according to a destruction indication.

15. The computer program product of claim 14, the destruction indication comprising expiration of the one or more associated retention rules.

16. The computer program product of claim 14 further operable to automatically destroy the first particular unstructured data instance and the second unstructured data instance in the storage system at the second hierarchical path.

17. The computer program product according to claim 10 further operable to incorporate an identifier of the identified structured data object into the second storage path of the particular unstructured data instance and the second unstructured data instance.

18. The computer program product of claim 17 further operable to:
   determine that the business requirement has expired; and
   destroy the archive object and the first particular unstructured data instance and the second unstructured data instance.

19. The computer program product of claim 10, the identified structured data object comprising a business object and the first particular unstructured data instance comprising a business document associated with the business object.

20. The computer program product of claim 10 further operable to:
   automatically apply a hold property to the archive object pursuant to a business requirement; and
   prevent destruction of the archive object, scheduled according to the destruction indication, and the first particular unstructured data instance and the second unstructured data instance.

21. A data archival system comprising:
   a memory storing:
      a plurality of structured data objects, at least a subset of the structured data objects associated with one or more unstructured data instances; and
      one or more retention rules associated with at least one of the plurality of structured data objects; and
   one or more processors executing instructions to:
      identify a particular one of the structured data objects to be archived, the structured data object associated with one or more of the retention rules;
      define, in a storage system, a first target hierarchical path for the identified data object;
      identify two or more unstructured data instances associated with the identified data object;
      define, in the storage system, a second target hierarchical path for a first one of the identified unstructured data instances associated with the identified structured data object, wherein the second hierarchical storage path corresponds, at least in part, to the first hierarchical storage path;
      archive the structured data object into an archive object in the storage system at the first hierarchical path, the archive object associated with one or more retention rules;
      archive the first particular unstructured data instance in the storage system at the second hierarchical path, wherein archiving the first particular unstructured data instance comprises storing the first particular unstructured data instance as a first node at the second hierarchical path;
      archive a second unstructured data instance associated with the identified structured data object in the storage system at the second hierarchical path, wherein archiving the second unstructured data instance comprises storing the second unstructured data instance as a second node at the second hierarchical path; and automatically propagate the one or more retention rules to the first particular unstructured data instance and the second unstructured data instance.

22. The system of claim 21, wherein identifying the particular structured data object comprises comparing one or more properties of the structured data object with the one or more retention rules.

23. The system of claim 21, the one or more processors further operable to effect any changes to the one or more retention rules associated with the structured data object to the first particular unstructured data instance and the second unstructured data instance.

24. The system of claim 21, the one or more processors further operable to:
   destroy the archive object according to a destruction indication; and
   automatically destroy the first particular unstructured data instance and the second unstructured data instance in the storage system at the second hierarchical path in response to the destruction of the archive object.

25. The system of claim 21, the identified structured data object comprising a business object and the first particular unstructured data instance comprising a business document associated with the business object.

* * * * *